United States Patent [19]
Yamashita

[11] Patent Number: 5,802,429
[45] Date of Patent: Sep. 1, 1998

[54] COPYING MACHINE CONNECTED TO A HOST COMPUTER FOR STORAGE AND RETRIEVAL OF HELP INFORMATION

[75] Inventor: Yuji Yamashita, Osaka, Japan

[73] Assignee: Mita Industrial Co., Ltd., Osaka, Japan

[21] Appl. No.: 738,884

[22] Filed: Oct. 28, 1996

[30] Foreign Application Priority Data

Oct. 30, 1995 [JP] Japan .................................. 7-281226

[51] Int. Cl.⁶ .................................................. G03G 15/00
[52] U.S. Cl. ...................................... 399/8; 364/188; 399/9
[58] Field of Search ........................... 399/8–10, 11, 399/18; 395/183.01, 183.22; 364/130, 188; 358/406, 296

[56] References Cited

U.S. PATENT DOCUMENTS

| | | | |
|---|---|---|---|
| 5,365,310 | 11/1994 | Jenkins et al. | 399/8 |
| 5,434,650 | 7/1995 | Nakahara et al. | 399/8 |

FOREIGN PATENT DOCUMENTS

| | | |
|---|---|---|
| 63-193226 | 8/1988 | Japan . |
| 1-4163 | 1/1989 | Japan . |
| 1-210371 | 8/1989 | Japan . |
| 5-61283 | 5/1993 | Japan . |
| 6-234258 | 9/1994 | Japan . |
| 8-171589 | 7/1996 | Japan . |

*Primary Examiner*—Sandra L. Brase
*Assistant Examiner*—Quana Grainger
*Attorney, Agent, or Firm*—Antonelli, Terry, Stout & Kraus, LLP

[57] ABSTRACT

A copying machine managing system for managing copying machines connected to a host computer via a circuit, wherein each copying machine includes a help data storage unit having a first storage region for storing simple help data related to the copying operation and a second storage region for temporarily storing detailed help data related to the copying operation. The detailed help data are transmitted from the host computer. The copying machine managing system further includes a detailed data request unit for requesting the host computer to transmit the detailed help data via a circuit; and a display unit for displaying the data stored in the help data storage unit. The host computer includes a data base for storing detailed data, and a help data retrieval unit for retrieving the corresponding detailed help data from the data base in compliance with a request from the detailed data request unit.

2 Claims, 7 Drawing Sheets

COPYING MACHINE CONNECTED TO A HOST COMPUTER FOR STORAGE AND RETRIEVAL OF HELP INFORMATION

FIELD OF THE INVENTION

The present invention relates a copying machine managing system and, particularly, to a copying machine managing system for managing copying machines connected to a host computer through a communication circuit.

DESCRIPTION OF THE PRIOR ART

Some copying machines are equipped with a so-called help function which, when a predetermined setting key is depressed, displays a brief description on a display means enabling the user to see an explanation related to the copying operation, such as changing the magnification, setting one surface or both surfaces, or splitting the surface. The help function makes it possible to easily carry out the copying operation without the need to obtain the explanation on the operation by making reference to an operation manual.

In order to reliably utilize the help function, the copying machine must be equipped with a large memory for storing help data related to the copying operation. Therefore, a memory having a capacity in an economically permissible range is not capable of storing detailed help data related to the copying operation but is capable of storing only simple help data. When it is desired to get help data more detailed than the help data stored in the memory, therefore, the user must make reference to the operation manual. However, the operation manual may not be present in the neighborhood of the copying machine and hence, the user's demand may not be satisfied.

SUMMARY OF THE INVENTION

A principal object of the present invention is to provide a copying machine managing system which allows a user to have detailed help data through a so-called help function without using a memory of large capacity.

Another object of the present invention is to provide a copying machine managing system which, when a user desires an operation manual related to the copying operations, can transmit required portions of the operation manual to a facsimile that has been registered in advance.

In order to accomplish the above-mentioned principal object according to the present invention, there is provided a copying machine managing system for managing copying machines connected to a host computer via a circuit, comprising:

a help data storage means disposed in the copying machine and having a first storage region for storing simple help data related to a plurality of copying operations and a second storage region for temporarily storing detailed help data related to the copying operations which is transmitted from the host computer;

a detailed data request means disposed in the copying machine for requesting the detailed help data related to the plurality of copying operations from the host computer via a circuit;

a display means disposed in the copying machine for displaying the data related to the copying operations stored in the help data storage means;

a data base provided in the host computer for storing detailed data related to the plurality of copying operations;

a help data retrieval means provided in the host computer for retrieving detailed help data related to the corresponding copying operations from the data base in compliance with a request from the detailed data request means; and a communication means for transmitting the request from the detailed data request means to the host computer via the circuit and for transmitting detailed help data related to the copying operations retrieved by the help data retrieval means to the copying machine.

In order to accomplish another object according to the present invention, there is provided a copying machine managing system wherein the data base stores an operation manual related to a plurality of copying operations, the copying machine is equipped with an operation manual transmission request means for requesting the transmission of an operation manual, and wherein the host computer transmits the operation manual requested by the manual transmission request means to a facsimile that has been registered in advance.

DETAILED DESCRIPTION OF PREFERRED EMBODIMENTS

A preferred embodiment of the copying machine managing system constituted according to the present invention will now be described in further detail with reference to the accompanying drawings.

Figure 1:
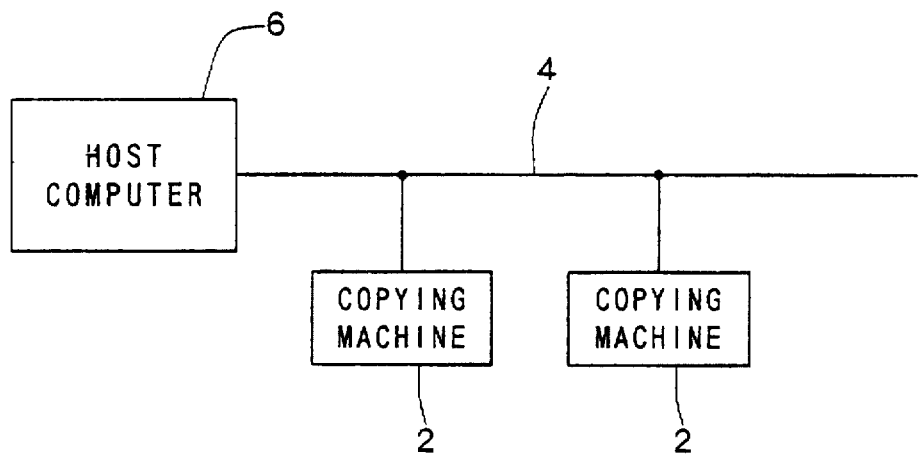
FIG. 1 is a diagram schematically illustrating the constitution of a copying machine managing system constituted according to an embodiment of the present invention.

FIG. 1 is a diagram schematically illustrating the constitution of the copying machine managing system constituted according to the present invention. The copying machine managing system comprises copying machines 2, and a host computer 6 connected to the copying machines 2 via a public circuit 4. As shown, the copying machine managing system is so constituted that the host computer 6 manages a plurality of copying machines 2, 2.

The copying machine 2 comprises an exposure means for reading documents, an image-forming means for forming the document read out by the exposure means into a toner image, a transfer means which is arranged in a transfer zone to transfer the toner image formed by the image-forming means onto a transfer paper, a paper-feeding means for feeding the transfer paper onto the transfer zone, and a fixing means for heat-fixing the toner image transferred onto the transfer paper in the transfer zone.

Figure 2:
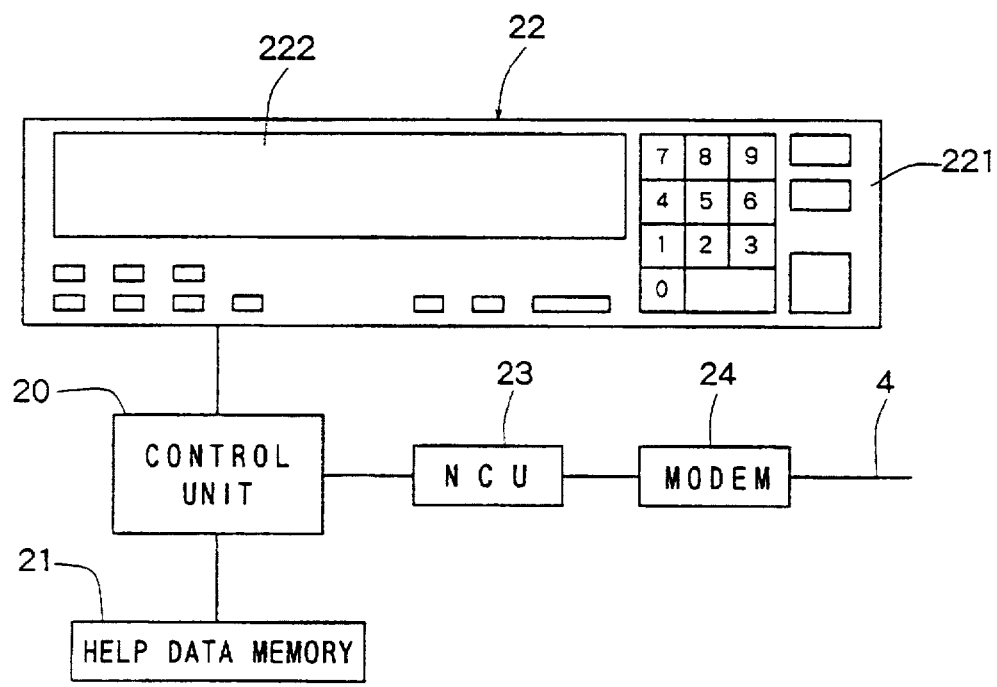
FIG. 2 is a block diagram schematically illustrating the constitution of a copying machine in the copying machine managing system shown in FIG.
Figure 3:
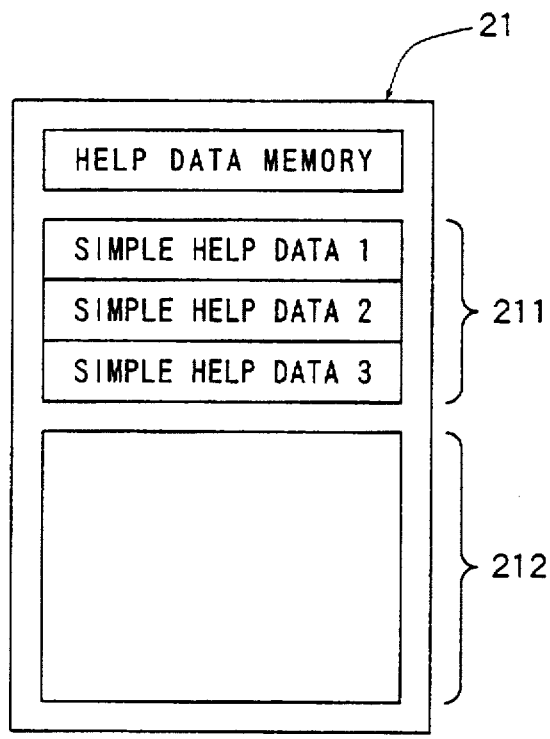
FIG. 3 is an explanatory diagram of a help data memory provided in the copying machine shown in FIG. 2.

The copying machine 2 includes a control unit 20 shown in FIG. 2. The control unit 20 is constituted by a central processing unit (CPU) which performs processing according to a control program, a read-only memory (ROM) for storing the control program, etc., a random access memory (RAM) for storing the results of operation, and a microcomputer that includes an input/output interface, etc. To the control unit 20 is connected a help data memory 21 which works as a help data storage means. The help data memory 21 is constituted by a random access memory (RAM), and has a first region 211 (FIG. 3) in which are stored in advance simple help data related to a plurality of copying operations (1), (2) and (3) such as changing the magnification, and a second region 212 which temporarily stores one of the detailed help data related to the plurality of operations (1), (2) and (3) transmitted from the host computer 6. An operation panel 22 is connected to the control unit 20. The operation panel 22 is arranged on the upper surface of the copying machine and includes a setting means 211, such as input keys, and a display means 222, constituted by liquid crystal display elements or LEDs. The control unit 20 is further connected to a public circuit 4 via a network control unit (NCU) 23 and a modem 24.

Figure 4:
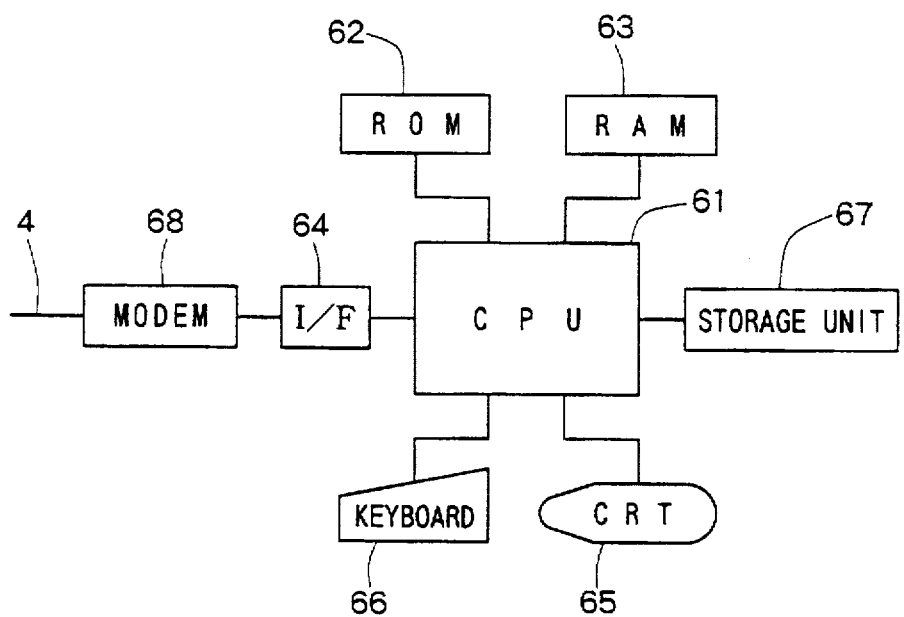
FIG. 4 is a block diagram schematically illustrating the constitution of a host computer in the copying machine managing system of FIG. 1.
Figure 5:
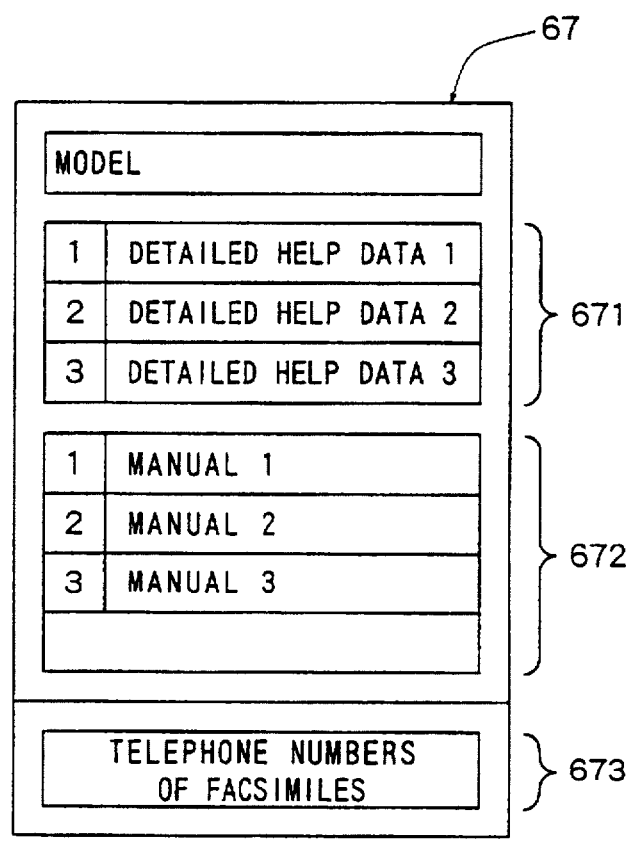
FIG. 5 is an explanatory diagram of a storage unit that is provided as a data base in the host computer of FIG. 4.

The host computer 6 is installed at, for example, a service center and includes, as shown in FIG. 4, a central processing unit (CPU) 61 for executing arithmetic processing according to a control program, a read-only memory (ROM) 62 for storing the control program, etc., a random access memory (RAM) 63 for storing the results of operation, and an input/output interface (I/F) 64. To the central processing unit (CPU) 61 are connected a CRT 65, which is a display means, a keyboard 66 for inputting data, and a storage unit 67 which is a data base. The storage unit 67 is constituted by, for example, a hard disk drive (HDD) or the like, and constitutes a data base having, as shown in FIG. 5, a region 671 for storing detailed data related to a plurality of copying operations (1), (2) and (3) stored in the help data memory 21 for each of the models of the copying machines 2, a region 672 for storing the operation manual related to the copying operations (1), (2) and (3), and a region 673 for storing telephone numbers of the facsimiles that have been registered in advance for each of the copying machines 2. The input/output interface (I/F) is connected to the public circuit 4 via the modem 68 for communication.

The copying machine managing system according to the diagramed embodiment is constituted as described above. The operation will now be described with reference to flow charts of FIGS. 6 and 7.

COPYING MACHINE OPERATION

Figure 6:
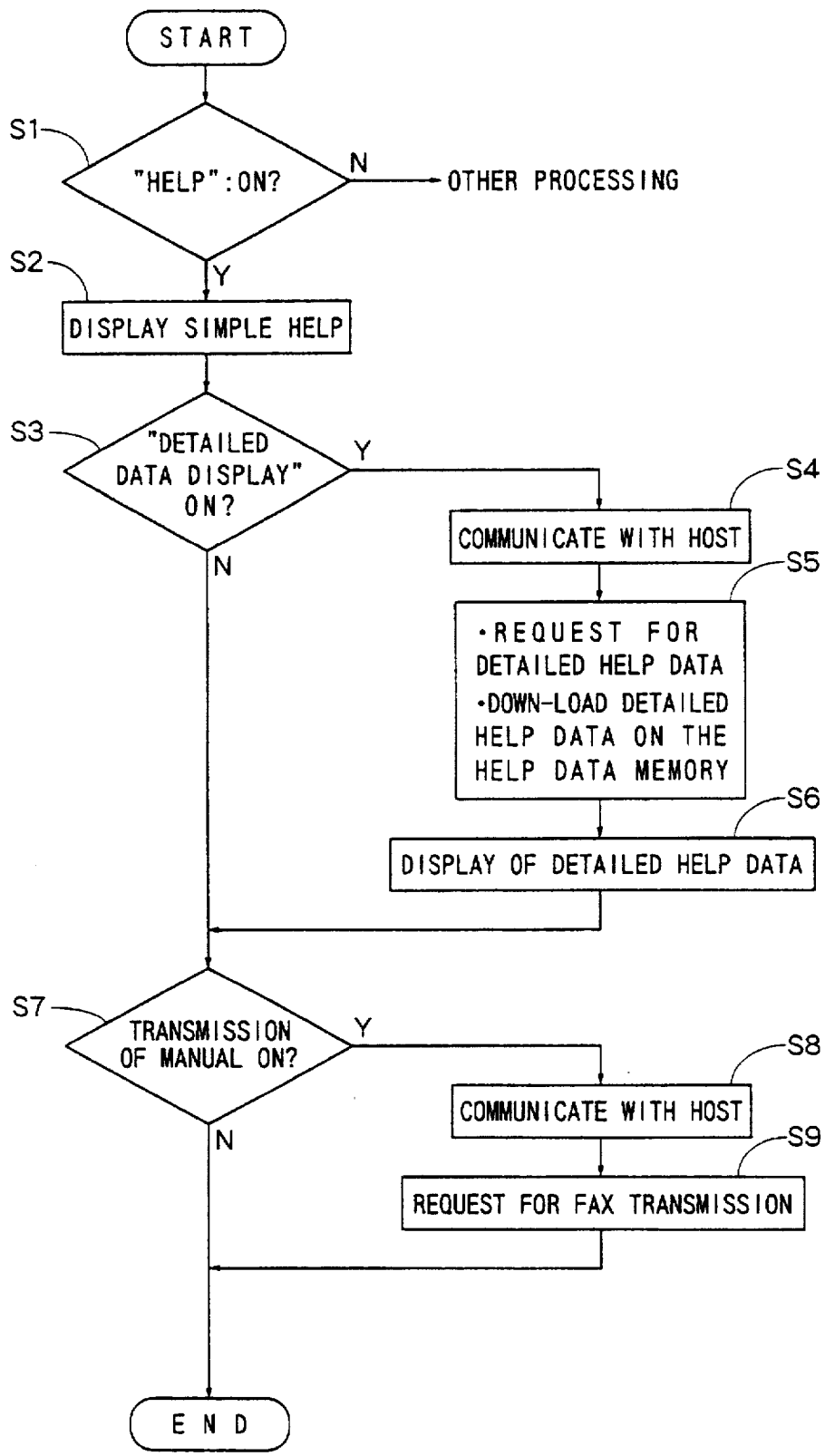
FIG. 6 is a flow chart illustrating the operation of a control unit in the copying machine shown in FIG. 2;FIG.

The operation of the copying machine 2 will now be described with reference to the flow chart of FIG. 6.

Figure 8:
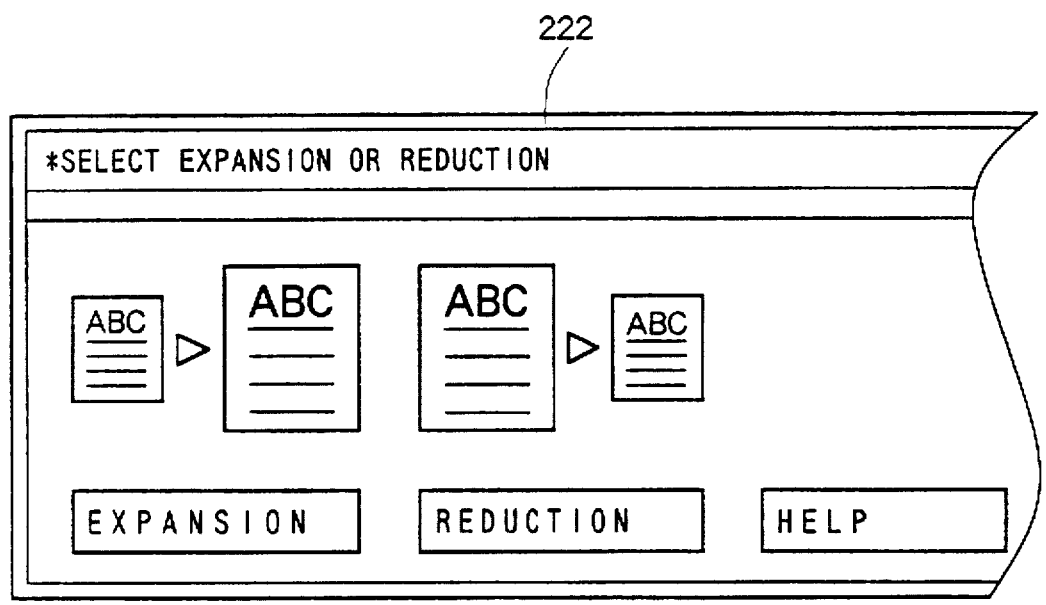
FIG. 8 is an explanatory diagram of an image displayed on a display means of the copying machine shown in FIG. 2.
Figure 9:
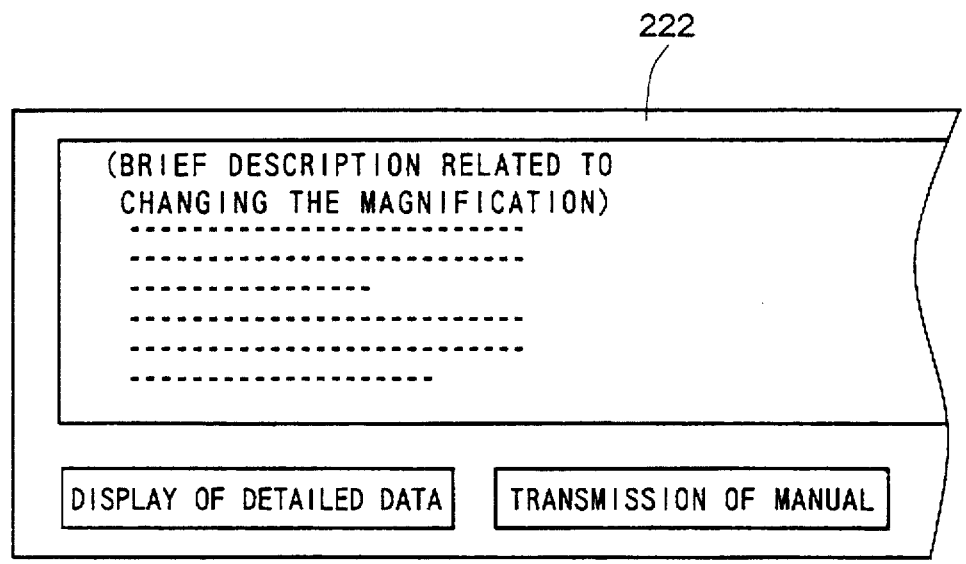
FIG. 9 is an explanatory diagram of an image displayed on the display means of the copying machine shown in FIG. 2.
Figure 10:
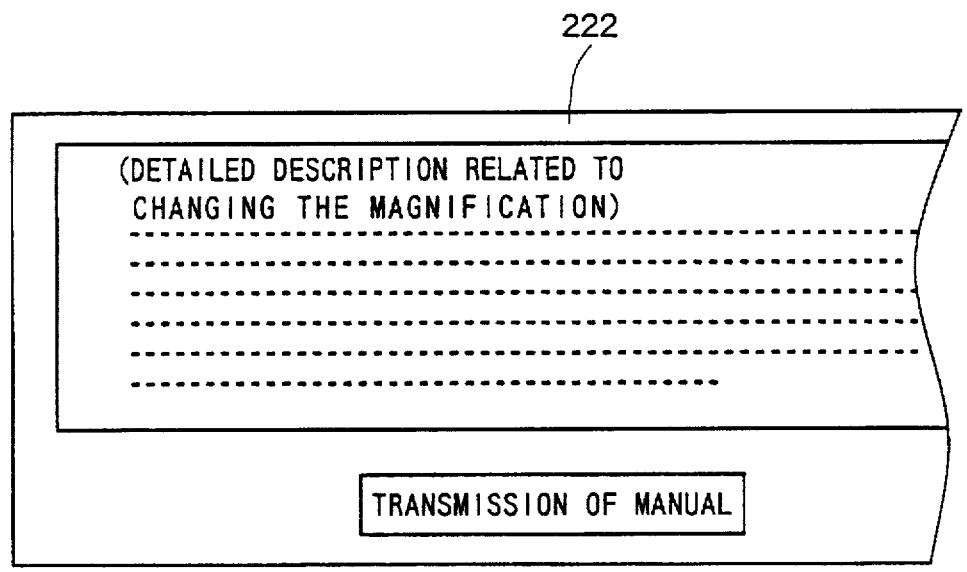
FIG. 10 is an explanatory diagram of an image displayed on the display means of the copying machine shown in FIG. 2.

The power source circuit of the copying machine 2 is closed and, for example, a magnification changing key is depressed in the setting means 221 arranged on the operation panel 22. Then, an image shown in, for example, FIG. 8 is displayed on the display means 222. In the image shown in FIG. 8, the positions indicated as "EXPANSION", "REDUCTION" and "HELP" are constituted so as to work as touch sensors. Therefore, when the indication "EXPANSION" is depressed, a plurality of expansion magnification values are displayed on the display means 222. When the indication "REDUCTION" is depressed, a plurality of reduction magnification values are displayed, and by depressing one of the expansion or reduction values, a desired magnification is selected from the displayed magnifications and is set. On the other hand, when it is desired to see a description related to changing the magnification, "HELP" on the image of FIG. 8 is depressed. The control unit 20 checks whether the "HELP" on the image of FIG. 8 is turned on or not (step S1). When it is not turned on, the control unit 20 executes other processing such as expansion or reduction. When "HELP" is turned on, a brief description related to changing the magnification is displayed on the display means 222 as shown in FIG. 9, and "DETAILED DATA DISPLAY" and "TRANSMISSION OF MANUAL" are displayed (step S2). In the image of FIG. 9, "DETAILED DATA DISPLAY" and "TRANSMISSION OF MANUAL" are also constituted so as to work as touch sensors. Next, the control unit 20 checks whether "DETAILED DATA DISPLAY" on the image shown in FIG. 9 is turned on or not (step S3). When it has not been turned on, the program proceeds to a step S7 that will be described later. When "DETAILED DATA DISPLAY" is turned on, the program proceeds to a step S4 where communication with the host computer 6 is started via the network control unit (NCU) 23, modem 24 and public circuit 4, and detailed help data related to changing the magnification are requested. Then, the detailed help data transmitted from the host computer 6 are down-loaded on the second region 212 of the help data memory 21 (step S5). When at the step S5 the detailed help data transmitted from the host computer 6 are down-loaded onto the second region 212 of the help data memory 21, the program in the control unit 20 proceeds to a step S6 where a detailed description related to changing the magnification is displayed on the display means 222 as shown in FIG. 10, and "TRANSMISSION OF MANUAL" is displayed as well. Thus, from the image displayed on the display means 222, the user is allowed to see detailed help data related to changing the magnification.

Next, the control unit 20 checks whether "TRANSMISSION OF MANUAL" on the image shown in FIG. 9 at a step S2 or on the image shown in FIG. 10 at the step S6 is turned on or not. When it has not been turned on, the processing ends. When "TRANSMISSION OF MANUAL" is turned on, the program proceeds to a step S8 where the communication with the host computer 6 is started via the network control unit (NCU) 23, modem 24 and public circuit 4, and transmission through a facsimile it is requested of the manual related to changing the magnification (step S9).

HOST COMPUTER OPERATION

Figure 7:
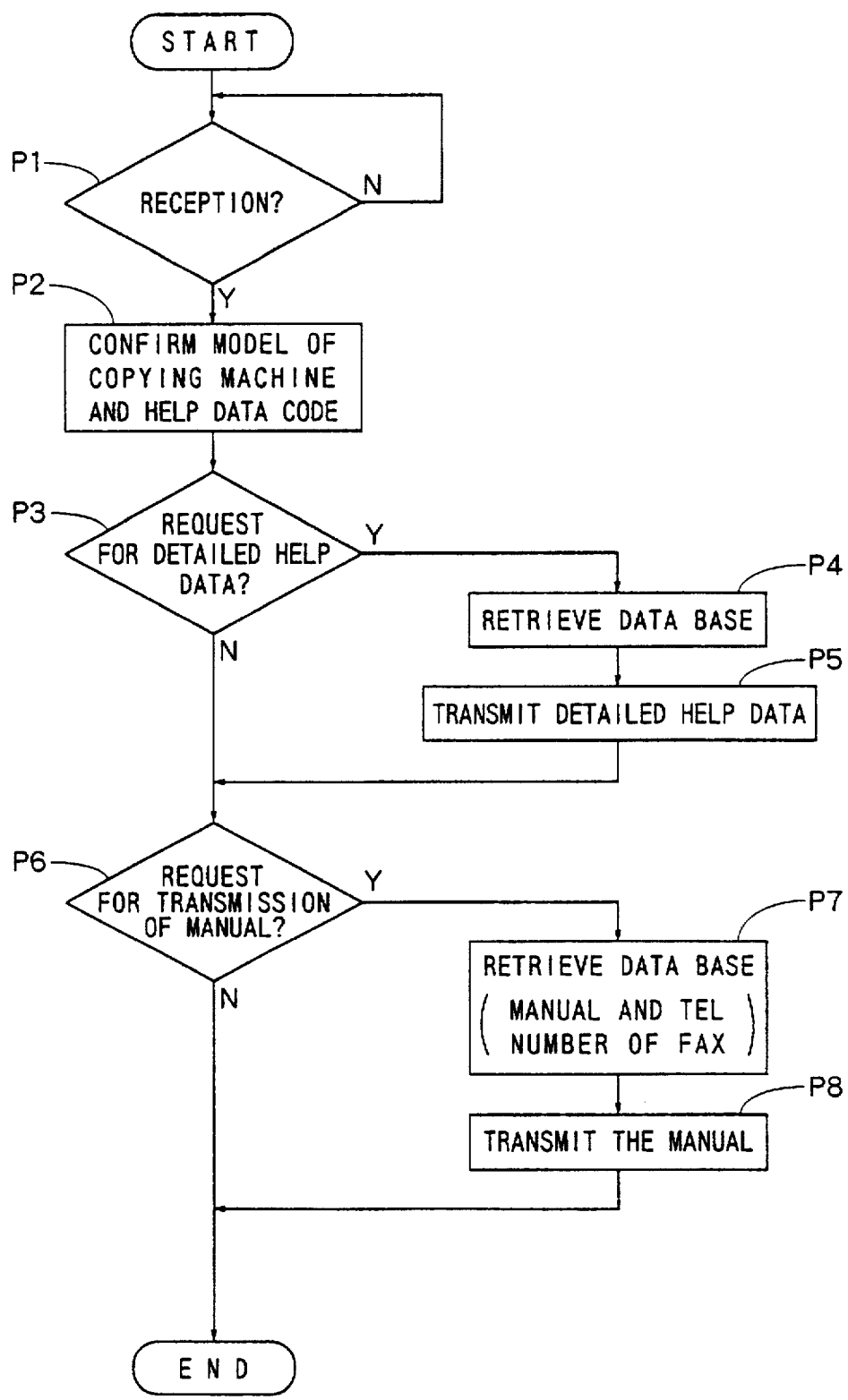
FIG. 7 is a flow chart illustrating the operation of the host computer shown in FIG. 4.

The host computer 6 executes the operation according to the steps of the flow chart of FIG. 7.

After confirming the reception of a transmission signal from the copying machine 2 (step P1), the central processing unit (CPU) 6 of the host computer 6 confirms the model of the copying machine 2 and the help data code (step P2). Next, the program in the central processing unit (CPU) 61 proceeds to a step P3 where it is checked whether detailed help data are requested by the copying machine. When the detailed help data is not requested at the step P3, the program proceeds to a step P6 that will be described later. When the detailed help data is requested at the step P3, the program of the central processing unit (CPU) 61 proceeds to a step P4 where the detailed help data (detailed help data related to changing the magnification in this case) requested by the copying machine 2 are retrieved from the storage unit 67 which is the data base. Then, the central processing unit (CPU) 61 transmits the detailed help data related to changing the magnification retrieved from the storage unit 67 to the copying machine 2 that has issued the request (step P5).

Figure 11:
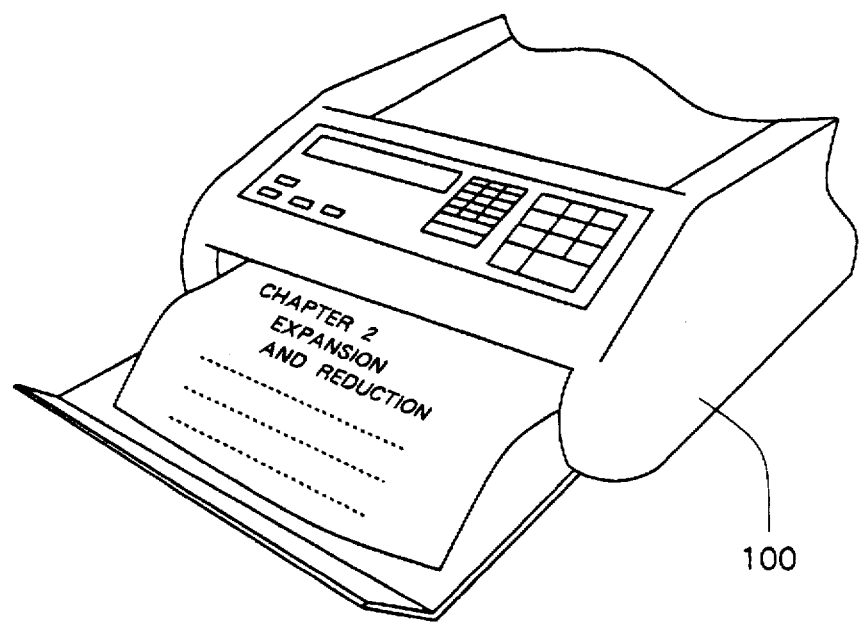
FIG. 11 is a perspective view illustrating a state where the operation manual has been transmitted from the host computer shown in FIG. 4 to a facsimile designated by the copying machine shown in FIG. 2.

Next, at a step P6, the central processing unit (CPU) 61 checks whether the transmission of a manual is requested or not. When the transmission of a manual is not requested, the processing ends. When the transmission of a manual is requested, the program proceeds to a step P7 where the manual this time, the manual that is related to changing the magnification is retrieved from the storage unit 67 that is the data base, and a telephone number of a facsimile machine designated by the copying machine 2 that has issued the request is retrieved. The central processing unit (CPU) 61 transmits the retrieved manual related to changing the magnification to the designated facsimile machine (step P8). Thus, the manual related to changing the magnification transmitted from the host computer 6 is printed as shown in FIG. 11 by the facsimile machine 100 designated by the copying machine 2 that has issued the request.

According to the copying machine managing system of the present invention, the user who wishes to see detailed help data related to the copying operation may transmit a request for detailed help data to the host computer from a copying machine. Then, the host computer retrieves the corresponding data from the data base and transmits the data to the copying machine. The copying machine down-loads the detailed help data transmitted from the host computer onto the help data storage means and displays it on the display means. Thus, reference can be made to the detailed help data, as required, through the so-called help function without providing the copying machine with the memory of a large capacity.

According to the present invention, furthermore, the data base stores the operation manual related to the copying operation. Upon receiving a request for transmitting the operation manual from the copying machine, the host computer transmits the requested operation manual to a facsimile machine that has been registered in advance. The corresponding operation manual can be readily obtained at any time upon request. Therefore, there is no need to attach the operation manual to the individual copying machines. Even when the operation manual is to be revised, the data need be updated in the host computer only, enabling the data to be quickly transmitted.

What I claim is:

1. A copying machine managing system, comprising:

a host computer;

a copying machine;

a help data storage means disposed in said copying machine, and having a first storage region for storing simple help data related to a plurality of copying operations and a second storage region for temporarily storing detailed help data related to the copying operations;

a detailed help data request means disposed in said copying machine for requesting detailed help data related to the plurality of copying operations from said host computer;

an operation manual transmission request means disposed in said copying machine for requesting the transmission of an operation manual;

a display means disposed in said copying machine for displaying help data stored in said help data storage means and related to the copying operations;

a data base provided in said host computer for storing detailed help data and an operation manual related to the plurality of copying operations, and for registering identification of a facsimile machine associated with said copying machine;

a help data retrieval means provided in said host computer for retrieving detailed help data related to the corresponding copying operations, from said data base in accordance with a request from said detailed help data request means;

an operation manual retrieval means provided in said host computer for retrieving the operation manual in accordance with a request from said operation manual transmission request means; and a communication means for transmitting requests from said detailed help data request means and from said operation manual transmission request means to said host computer and for transmitting detailed help data, related to the copying operations and retrieved by said help data retrieval means, to said copying machine and transmitting the operation manual retrieved by said operation manual retrieval means to the facsimile machine associated with said copying machine, as registered in said data base.

2. A copying machine managing system, comprising:

a host computer;

a copying machine;

a help data storage means disposed in said copying machine, and having a first storage region for storing simple help data related to a plurality of copying operations and a second storage region for temporarily storing detailed help data related to the copying operations;

a simple help data display request means disposed in said copying machine for requesting display of simple help data related to the plurality of copying operations;

a detailed help data display request means disposed in said copying machine for requesting display of detailed help data related to the plurality of copying operations;

an operation manual data request means disposed in said copying machine for requesting operational manual data related to the plurality of copying operations;

a detailed help data base provided in said host computer for storing detailed help data related to the plurality of copying operations;

an operation manual data base provided in said host computer for storing operation manual data related to the plurality of copying operations and for registering identification of a facsimile machine associated with said copying machine;

a detailed help data retrieval means provided in said host computer and responsive to a request for display of detailed help data for retrieving the requested detailed help data from said detailed help data base;

an operation manual data retrieval means provided in said host computer and responsive to a request for operation manual data, for retrieving the requested operation manual data from said operation manual data base;

a communication circuit connecting said copying machine to said host computer, for communicating requests for display of detailed help data and requests for operation manual data from said copying machine to said host computer, and communicating retrieved detailed help data from said host computer to said copying machine for storage in said second storage region and communicating retrieved operation manual data from said host computer to the facsimile machine associated with said copying machine, as registered in said host computer; and a display means disposed in said copying machine, responsive to a request for display of simple help data stored in said first storage region for displaying the requested simple help data, and responsive to a request for display of detailed help data stored in said second storage region for displaying the requested detailed help data.

* * * * *